United States Patent
Zhu et al.

(10) Patent No.: US 9,000,122 B1
(45) Date of Patent: Apr. 7, 2015

(54) AROMATIC POLY (ETHER SULFONE IMIDE) MEMBRANES FOR GAS SEPARATIONS

(71) Applicant: UOP LLC, Des Plaines, IL (US)

(72) Inventors: Zhixue Zhu, New Providence, NJ (US); Chunqing Liu, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/108,321

(22) Filed: Dec. 16, 2013

(51) Int. Cl.
*C08G 69/08* (2006.01)
*B01D 71/68* (2006.01)
*B01D 53/22* (2006.01)
*C08G 75/23* (2006.01)

(52) U.S. Cl.
CPC .............. *B01D 71/68* (2013.01); *B01D 53/228* (2013.01); *C08G 75/23* (2013.01)

(58) Field of Classification Search
CPC ....................................................... C08G 69/08
USPC .......................... 528/310; 525/432, 436; 502/4
See application file for complete search history.

(56) References Cited

U.S. PATENT DOCUMENTS

| | | | | |
|---|---|---|---|---|
| 5,608,014 | A * | 3/1997 | Ekiner | 525/432 |
| 2004/0177753 | A1* | 9/2004 | Chung et al. | 95/43 |
| 2008/0143014 | A1* | 6/2008 | Tang | 264/216 |
| 2011/0000367 | A1* | 1/2011 | Kanougi et al. | 95/52 |
| 2013/0196562 | A1* | 8/2013 | Hou et al. | 442/327 |

OTHER PUBLICATIONS

Park et al. (Journal of Membrane Science 229 (2004) 117-127.*

* cited by examiner

*Primary Examiner* — Shane Fang

(57) ABSTRACT

The present invention is for aromatic poly(ether sulfone imide) membranes and methods for making and using these membranes for gas, vapor, and liquid separations. The membranes may be fabricated into any known membrane configuration including a flat sheet or hollow fiber. An embodiment of the present invention is for aromatic poly(ether sulfone imide) polymers, aromatic poly(ether sulfone imide) membranes and UV cross-linked aromatic poly(ether sulfone imide) membranes made from these polymers.

9 Claims, No Drawings

AROMATIC POLY (ETHER SULFONE IMIDE) MEMBRANES FOR GAS SEPARATIONS

BACKGROUND OF THE INVENTION

This invention relates to aromatic poly(ether sulfone imide) membranes and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including N2 enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes that have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or extraordinarily large membrane surface areas is required to allow separation of large amounts of material. Permeance, measured in Gas Permeation Units (GPU, 1 GPU=$10^{-6}$ cm$^3$ (STP)/cm$^2$s (cmHg)), is the pressure normalized flux and equals to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin". However, fabrication of defect-free high selectivity asymmetric integrally skinned polyimide membranes is difficult. The presence of nanopores or defects in the skin layer reduces the membrane selectivity. Sometimes the high shrinkage of the polyimide membrane on cloth substrate during membrane casting and drying process results in unsuccessful fabrication of asymmetric integrally skinned polyimide membranes using phase inversion technique.

U.S. Pat. No. 5,917,137 and U.S. Pat. No. 5,608,014 disclosed gas separation membranes prepared from blend of polyethersulfone with aromatic polyimides, polyamides, or polyamide-imides. The blending of polyethersulfone with aromatic polyimides can improve polyimide membrane properties such as processability, contaminant resistance, and selectivity. However, aromatic polyethersulfone is only miscible with very limited numbers of aromatic polyimides. The immiscibility of aromatic polyethersulfone with most of the aromatic polyimides makes the blend of polyethersulfone and aromatic polyimides difficult to be fabricated into gas separation membranes.

The present invention discloses a new type of aromatic poly(ether sulfone imide) membranes and methods for making and using these membranes. The aromatic poly(ether sulfone imide) membranes are made from a new aromatic poly(ether sulfone imide) synthesized by copolymerization of an aromatic diamine, at least one aromatic ether sulfone-based diamine and pyromellitic dianhydride.

SUMMARY OF THE INVENTION

The invention involves a polymer and membranes made from the polymer. The polymer is an aromatic poly(ether sulfone imide) polymer comprising a plurality of repeating units of formula (I)

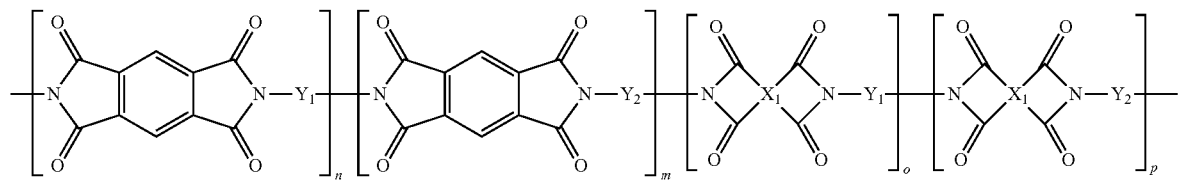

wherein $X_1$ is selected from the group consisting of
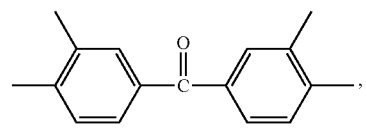
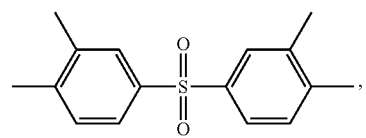
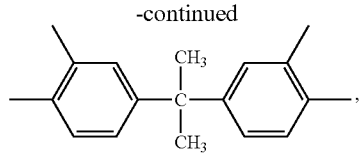
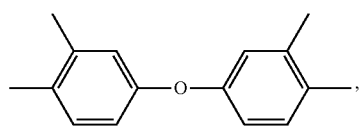
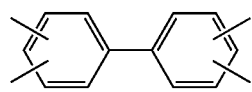
and mixtures thereof; wherein $Y_1$ is selected from the group consisting of
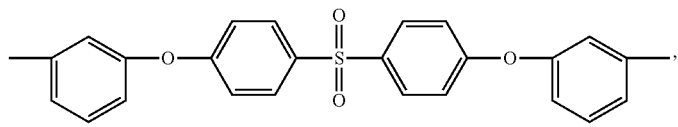
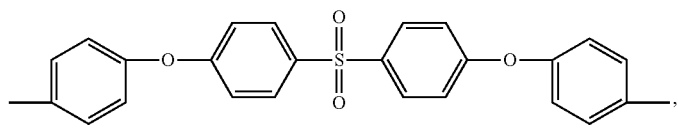
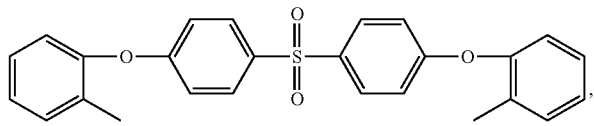
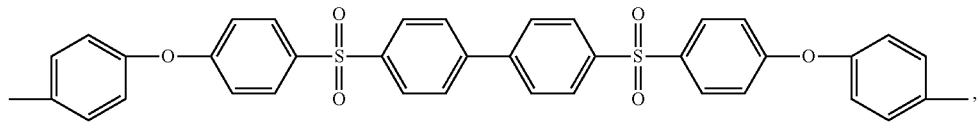
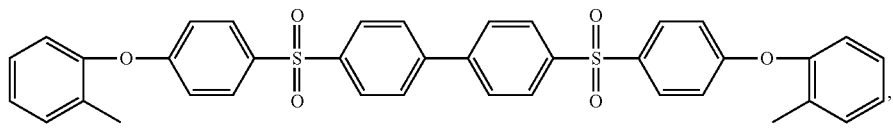
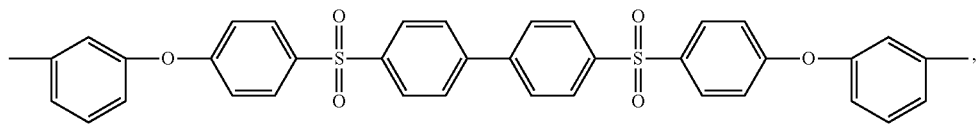
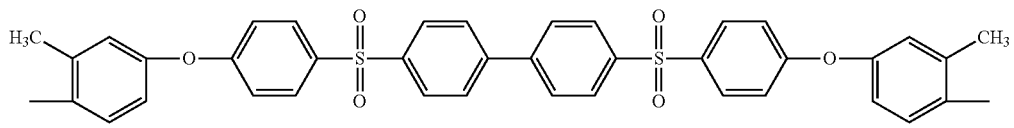

and mixtures thereof; wherein $Y_2$ is selected from the group consisting of

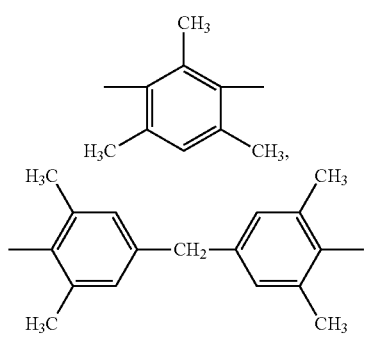

and a mixture thereof; n, m, o and p are independent integers from 2 to 500; and the molar ratio of (n+o)/(m+p) is in a range of 1:10 to 10:1.

The polymers of this invention include of poly(pyromellitic dianhydride-4,4'-bis[4-(3-aminophenoxyl)benzenesulfonyl]biphenyl-2,4,6-trimethyl-m-phenylenediamine) polyimide; poly(pyromellitic dianhydride-4,4'-bis[4-(3-aminophenoxyl)benzenesulfonyl]biphenyl-3,3',5,5'-tetramethyl-4,4'-methylene dianiline)polyimide; poly (pyromellitic dianhydride-4,4'-bis(3-aminophenoxy)diphenylsulfone-2,4,6-trimethyl-m-phenylenediamine) polyimide; poly(pyromellitic dianhydride-4,4'-bis(3-aminophenoxy)diphenylsulfone-3,3',5,5'-tetramethyl-4,4'-methylene dianiline)polyimide; poly(pyromellitic dianhydride-4,4'-bis[4-(4-amino-3-methylphenoxy)benzenesulfonyl)]biphenyl-2,4,6-trimethyl-m-phenylenediamine) polyimide; poly(pyromellitic dianhydride-4,4'-bis[4-(4-amino-3-methylphenoxy)benzenesulfonyl)]biphenyl-3,3',5,5'-tetramethyl-4,4'-methylene dianiline)polyimide.

The membranes are useful for a variety of separations and purifications of liquids and gases including separation of acid gases from natural gas, separations of sulfur from hydrocarbon fuels, separations of olefins and paraffins as well as other separations described herein.

DETAILED DESCRIPTION OF THE INVENTION

The present invention is for aromatic poly(ether sulfone imide) membranes and methods for making and using these membranes for gas, vapor, and liquid separations.

An embodiment of the present invention is for aromatic poly(ether sulfone imide) polymers, aromatic poly(ether sulfone imide) membranes and UV cross-linked aromatic poly(ether sulfone imide) membranes made from these polymers.

The aromatic poly(ether sulfone imide) polymer comprises a plurality of repeating units of formula (I)

wherein $X_1$ is selected from the group consisting of

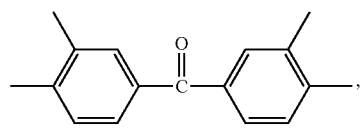

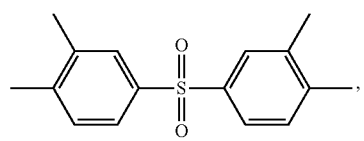

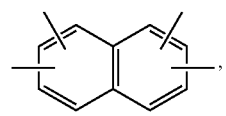 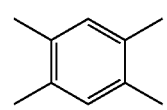

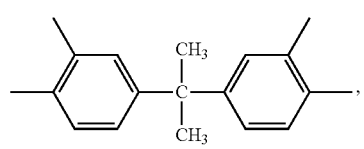

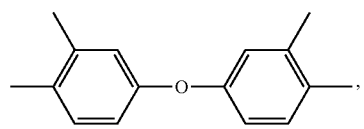

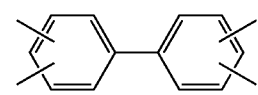

and mixtures thereof; wherein $Y_1$ is selected from the group consisting of

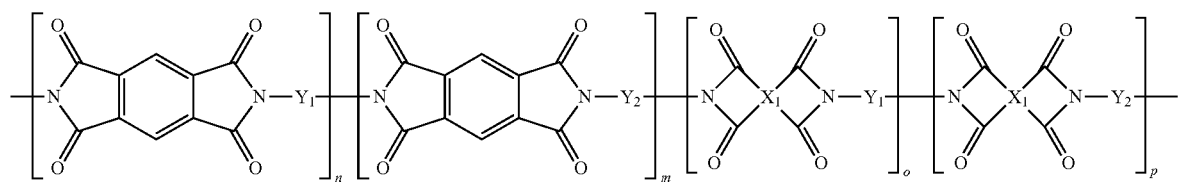

(I)

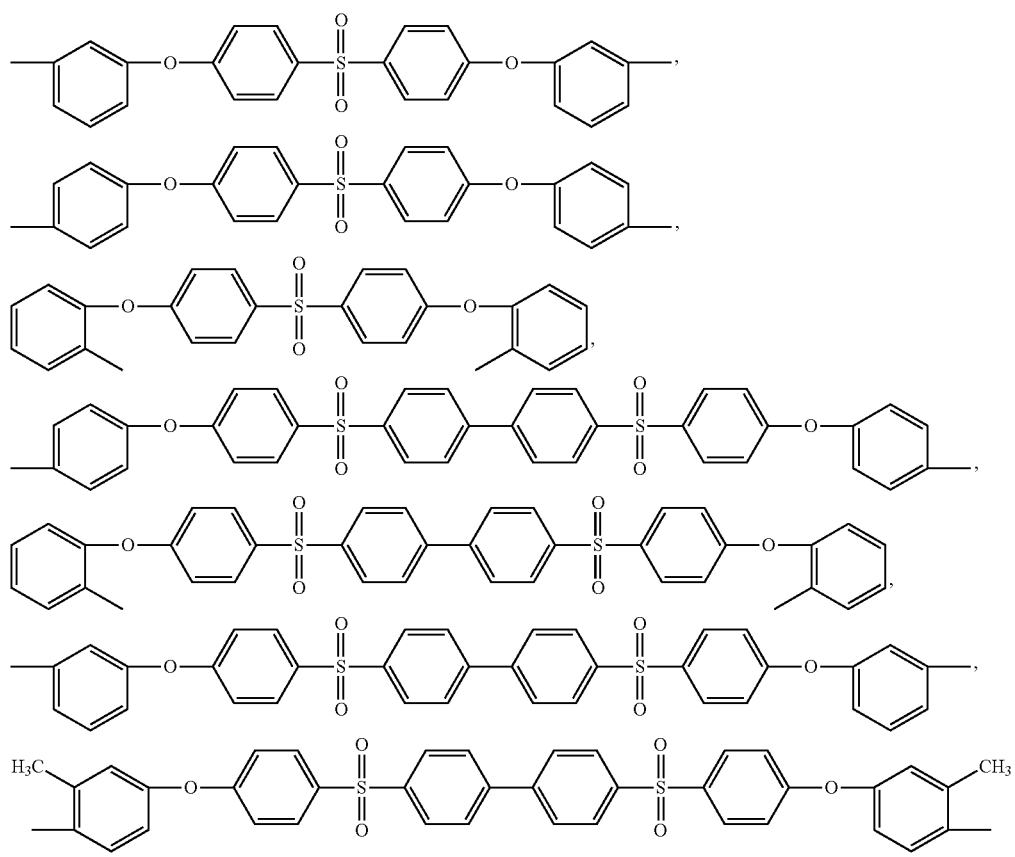

and mixtures thereof; wherein $Y_2$ is selected from the group consisting of

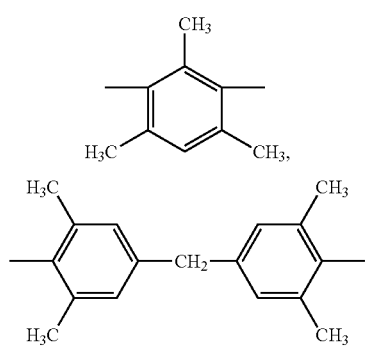

and a mixture thereof; n, m, o and p are independent integers from 2 to 500; the molar ratio of (n+o)/(m+p) is in a range of 1:10 to 10:1; preferably, the molar ratio of (n+o)/(m+p) is in a range of 1:5 to 2:1. Within formula (I), preferably $X_1$ is selected from the group consisting of

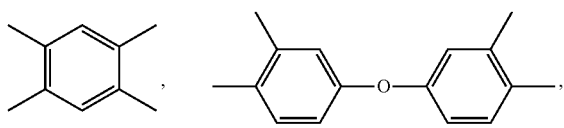

-continued

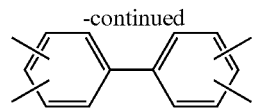

and mixtures thereof.

The aromatic poly(ether sulfone imide) polymer described in the present invention has a weight average molecular weight in the range of 10,000 to 1,000,000 Daltons, preferably between 70,000 to 500,000 Daltons.

The invention further comprises an aromatic poly(ether sulfone imide) polymer membrane formed from an aromatic poly(ether sulfone imide) polymer with formula (I) and a process for preparing the aromatic poly(ether sulfone imide) polymer membrane. The process for preparing the aromatic poly(ether sulfone imide) polymer membrane comprises (a) making an aromatic poly(ether sulfone imide) dope solution comprising the aromatic poly(ether sulfone imide), solvents which are miscible with water and can dissolve the aromatic poly(ether sulfone imide), and non-solvents which cannot dissolve the aromatic poly(ether sulfone imide); (b) fabricating said aromatic poly(ether sulfone imide) dope solution into an aromatic poly(ether sulfone imide) membrane in either flat sheet or hollow fiber geometry by casting a thin layer of said aromatic poly(ether sulfone imide) dope solution onto a supporting substrate or spinning said aromatic poly(ether sulfone imide) dope solution and a bore fluid simultaneously from an annular spinneret followed by solvent and non-solvent evaporating, coagulating, washing, and drying; and (c) coating a high permeability material such as a fluoropolymer, a thermally curable silicone rubber, or a UV radiation curable epoxy silicone onto said aromatic poly(ether sulfone imide) membrane.

The invention further comprises a UV cross-linked aromatic poly(ether sulfone imide) polymer membrane formed from an aromatic poly(ether sulfone imide) polymer membrane described in the present invention. The UV cross-linked aromatic poly(ether sulfone imide) polymer membrane is prepared by UV cross-linking of the aromatic poly(ether sulfone imide) polymer membrane via UV radiation. The aromatic poly(ether sulfone imide) polymers used for the preparation of the aromatic poly(ether sulfone imide) polymer membranes described in the current invention have UV cross-linkable sulfonic functional groups. The cross-linked aromatic poly(ether sulfone imide) polymer membranes comprise polymer chain segments where at least part of these polymer chain segments are cross-linked to each other through possible direct covalent bonds by exposure to UV radiation. The cross-linking of the aromatic poly(ether sulfone imide) polymer membranes provides the membranes with improved selectivities and slightly decreased permeances compared to the corresponding uncross-linked aromatic poly(ether sulfone imide) polymer membranes.

The aromatic poly(ether sulfone imide) polymer membranes and the cross-linked aromatic poly(ether sulfone imide) polymer membranes of the invention may be fabricated into any known membrane configuration or form such as flat sheet or hollow fiber.

Some preferred examples of the aromatic poly(ether sulfone imide) polymer of the invention may be selected from the group consisting of poly(pyromellitic dianhydride-4,4'-bis[4-(3-aminophenoxyl)benzenesulfonyl]biphenyl-2,4,6-trimethyl-m-phenylenediamine)polyimide derived from a polycondensation reaction of pyromellitic dianhydride with a mixture of 4,4'-bis[4-(3-aminophenoxyl)benzenesulfonyl]biphenyl and 2,4,6-trimethyl-m-phenylenediamine; poly(pyromellitic dianhydride-4,4'-bis[4-(3-aminophenoxyl)benzenesulfonyl]biphenyl-3,3',5,5'-tetramethyl-4,4'-methylene dianiline)polyimide derived from a polycondensation reaction of pyromellitic dianhydride with a mixture of 4,4'-bis[4-(3-aminophenoxyl)benzenesulfonyl]biphenyl and 3,3',5,5'-tetramethyl-4,4'-methylene dianiline; poly(pyromellitic dianhydride-4,4'-bis(3-aminophenoxy)diphenylsulfone-2,4,6-trimethyl-m-phenylenediamine)polyimide derived from a polycondensation reaction of pyromellitic dianhydride with a mixture of 4,4'-bis(3-aminophenoxy)diphenylsulfone and 2,4,6-trimethyl-m-phenylenediamine; poly(pyromellitic dianhydride-4,4'-bis(3-aminophenoxy)diphenylsulfone-3,3',5,5'-tetramethyl-4,4'-methylene dianiline)polyimide derived from a polycondensation reaction of pyromellitic dianhydride with a mixture of 4,4'-bis(3-aminophenoxy)diphenylsulfone and 3,3',5,5'-tetramethyl-4,4'-methylene dianiline; poly(pyromellitic dianhydride-4,4'-bis[4-(4-amino-3-methylphenoxy)benzenesulfonyl)]biphenyl-2,4,6-trimethyl-m-phenylenediamine)polyimide derived from a polycondensation reaction of pyromellitic dianhydride with a mixture of 4,4'-bis[4-(4-amino-3-methylphenoxy)benzenesulfonyl)]biphenyl and 2,4,6-trimethyl-m-phenylenediamine; poly(pyromellitic dianhydride-4,4'-bis[4-(4-amino-3-methylphenoxy)benzenesulfonyl)]biphenyl-3,3',5,5'-tetramethyl-4,4'-methylene dianiline)polyimide derived from a polycondensation reaction of pyromellitic dianhydride with a mixture of 4,4'-bis[4-(4-amino-3-methylphenoxy)benzenesulfonyl)]biphenyl and 3,3',5,5'-tetramethyl-4,4'-methylene dianiline.

The cross-linked aromatic poly(ether sulfone imide) polymer and the cross-linked aromatic poly(ether sulfone imide) polymer membrane described in the present invention comprise polymer chain segments where at least part of these polymer chain segments are cross-linked to each other through possible direct covalent bonds by exposure to UV radiation. The cross-linked aromatic poly(ether sulfone imide) polymer membrane described in the present invention showed high selectivity and good permeability for a variety of gas separation applications such as CO2/CH4 and H2/CH4 separations. For example, the cross-linked aromatic poly(pyromellitic dianhydride-4,4'-bis[4-(3-aminophenoxyl)benzenesulfonyl]biphenyl-3,3',5,5'-tetramethyl-4,4'-methylene dianiline)polyimide membrane (abbreviated as PMDA-6RSDA-TMMDA) formed from aromatic poly(pyromellitic dianhydride-4,4'-bis[4-(3-aminophenoxyl)benzenesulfonyl]biphenyl-3,3',5,5'-tetramethyl-4,4'-methylene dianiline) polyimide that was produced from a polycondensation reaction of pyromellitic dianhydride with a mixture of 4,4'-bis[4-(3-aminophenoxyl)benzenesulfonyl]biphenyl and 3,3',5,5'-tetramethyl-4,4'-methylene dianiline (molar ratio of 4,4'-bis[4-(3-aminophenoxyl)benzenesulfonyl]biphenyl to 3,3',5,5'-tetramethyl-4,4'-methylene dianiline is 1:1) has CO2 permeability of 7.9 Barrers and high CO2/CH4 selectivity of 52 for CO2/CH4 separation. This cross-linked PMDA-6RSDA-TMMDA membrane also has H2 permeability of 41 Barrers and high H2/CH4 selectivity of 270 for H2/CH4 separation.

The invention also involves a process for separating at least one gas from a mixture of gases comprising providing the aromatic poly(ether sulfone imide) polymer membrane or the cross-linked aromatic poly(ether sulfone imide) polymer membrane described in the present invention; contacting the mixture of gases to one side of the aromatic poly(ether sulfone imide) polymer membrane or the cross-linked aromatic poly(ether sulfone imide) polymer membrane to cause at least one gas to permeate said membrane; and removing from an opposite side of said aromatic poly(ether sulfone imide) polymer membrane or the cross-linked aromatic poly(ether sulfone imide) polymer membrane a permeate gas composition comprising a portion of said at least one gas that permeated said membrane.

The aromatic poly(ether sulfone imide) polymer membrane or the cross-linked aromatic poly(ether sulfone imide) polymer membrane described in the present invention is especially useful in the purification, separation or adsorption of a particular species in the liquid or gas phase. In addition to separation of pairs of gases, the aromatic poly(ether sulfone imide) polymer membrane or the cross-linked aromatic poly(ether sulfone imide) polymer membrane described in the present invention may, for example, be used for the desalination of water by reverse osmosis or for the separation of proteins or other thermally unstable compounds, e.g. in the pharmaceutical and biotechnology industries. The aromatic poly(ether sulfone imide) polymer membrane or the cross-linked aromatic poly(ether sulfone imide) polymer membrane described in the present invention may also be used in fermenters and bioreactors to transport gases into the reaction vessel and transfer cell culture medium out of the vessel. Additionally, the aromatic poly(ether sulfone imide) polymer membrane or the cross-linked aromatic poly(ether sulfone imide) polymer membrane described in the present invention may be used for the removal of microorganisms from air or water streams, water purification, ethanol production in a continuous fermentation/membrane pervaporation system, and in detection or removal of trace compounds or metal salts in air or water streams.

The aromatic poly(ether sulfone imide) polymer membrane or the cross-linked aromatic poly(ether sulfone imide)

polymer membrane described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of He, CO2 or H2S from natural gas, H2 from N2, CH4, and Ar in ammonia purge gas streams, H2 recovery in refineries, olefin/paraffin separations such as propylene/propane separation, xylene separations, iso/normal paraffin separations, liquid natural gas separations, C2+ hydrocarbon recovery. Any given pair or group of gases that differ in molecular size, for example nitrogen and oxygen, carbon dioxide and methane, hydrogen and methane or carbon monoxide, helium and methane, can be separated using the aromatic poly(ether sulfone imide) polymer membrane or the cross-linked aromatic poly(ether sulfone imide) polymer membrane described in the present invention. More than two gases can be removed from a third gas. For example, some of the gas components which can be selectively removed from a raw natural gas using the aromatic poly(ether sulfone imide) polymer membrane or the cross-linked aromatic poly(ether sulfone imide) polymer membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the aromatic poly(ether sulfone imide) polymer membrane or the cross-linked aromatic poly(ether sulfone imide) polymer membrane of the present invention will range from about −20° to about 100° C., and most preferably, the effective operating temperature of the membranes of the present invention will range from about 25° to about 100° C.

The aromatic poly(ether sulfone imide) polymer membrane or the cross-linked aromatic poly(ether sulfone imide) polymer membrane described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinyl-chloride monomer, propylene) may be recovered. Further examples of gas/vapor separation processes in which the aromatic poly(ether sulfone imide) polymer membrane or the cross-linked aromatic poly(ether sulfone imide) polymer membrane described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The aromatic poly(ether sulfone imide) polymer membrane or the cross-linked aromatic poly(ether sulfone imide) polymer membrane described in the present invention may incorporate a species that adsorbs strongly to certain gases (e.g. cobalt porphyrins or phthalocyanines for 02 or silver (I) for ethane) to facilitate their transport across the membrane.

The aromatic poly(ether sulfone imide) polymer membrane or the cross-linked aromatic poly(ether sulfone imide) polymer membrane described in the present invention also has immediate application to concentrate olefin in a paraffin/olefin stream for olefin cracking application. For example, the aromatic poly(ether sulfone imide) polymer membrane or the cross-linked aromatic poly(ether sulfone imide) polymer membrane described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the aromatic poly(ether sulfone imide) polymer membrane or the cross-linked aromatic poly(ether sulfone imide) polymer membrane described in the present invention is for separating isoparaffin and normal paraffin in light paraffin isomerization and MaxEne™, a process from UOP LLC, Des Plaines, Ill., for enhancing the concentration of normal paraffin (n-paraffin) in the naphtha cracker feedstock, which can be then converted to ethylene.

The aromatic poly(ether sulfone imide) polymer membrane or the cross-linked aromatic poly(ether sulfone imide) polymer membrane described in the present invention can also be operated at high temperature to provide the sufficient dew point margin for natural gas upgrading (e.g., CO2 removal from natural gas). The aromatic poly(ether sulfone imide) polymer membrane or the cross-linked aromatic poly(ether sulfone imide) polymer membrane described in the present invention can be used in either a single stage membrane or as the first or/and second stage membrane in a two stage membrane system for natural gas upgrading.

The aromatic poly(ether sulfone imide) polymer membrane or the cross-linked aromatic poly(ether sulfone imide) polymer membrane described in the present invention may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using the aromatic poly(ether sulfone imide) polymer membrane or the cross-linked aromatic poly(ether sulfone imide) polymer membrane described in the present invention is the deep desulfurization of gasoline and diesel fuels by a pervaporation membrane process similar to the process described in U.S. Pat. No. 7,048,846, incorporated by reference herein in its entirety. The aromatic poly(ether sulfone imide) polymer membrane or the cross-linked aromatic poly(ether sulfone imide) polymer membrane described in the present invention that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the aromatic poly(ether sulfone imide) polymer membrane or the cross-linked aromatic poly(ether sulfone imide) polymer membrane described in the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

EXAMPLES

The following examples are provided to illustrate one or more preferred embodiments of the invention, but are not limited embodiments thereof. Numerous variations can be made to the following examples that lie within the scope of the invention.

Example 1

Synthesis of PMDA-6RSDA-TMMDA Polyimide

PMDA-6RSDA-TMMDA polyimide was synthesized from a polycondensation reaction of pyromellitic dianhydride (PMDA) with a mixture of 4,4'-bis[4-(3-aminophenoxyl)benzenesulfonyl]biphenyl(6RSDA) and 3,3',5,5'-tetramethyl-4,4'-methylene dianiline (TMMDA) in DMAc polar solvent by a two-step process involving the formation of the poly(amic acid) followed by a solution imidization process. Acetic anhydride was used as the dehydrating agent and pyridine was used as the imidization catalyst for the solution imidization reaction. In this example, a 1 L three-neck round-bottom flask equipped with a nitrogen inlet and a mechanical stirrer was charged with 19.9 g of TMMDA, 50.8 g of 4,4'-bis[4-(3-aminophenoxyl)benzenesulfonyl]biphenyl and 315 g of DMAc. Once TMMDA and 4,4'-bis[4-(3-aminophenoxyl)benzenesulfonyl]biphenyl were fully dissolved, 34.2 g of PMDA was added to the TMMDA and 4,4'-bis[4-(3-aminophenoxyl)benzenesulfonyl]biphenyl solution in the flask. Then 280 g of DMAc was added to the solution in two portions. The reaction mixture was mechanically stirred for 24 hours at ambient temperature to give a viscous poly(amic acid) solution. Then 35.2 g of acetic anhydride and 31.0 g of pyridine were added to the reaction mixture under stirring. The reaction mixture was mechanically stirred for an additional 3 hour at 95° C. to yield the PMDA-6RSDA-TMMDA polyimide. The PMDA-6RSDA-TMMDA polyimide product in a power form was recovered by adding methanol to the reaction mixture under mechanical stirring. The resultant PMDA-6RSDA-TMMDA polyimide powder was then thoroughly rinsed with methanol and dried in a vacuum oven at 200° C. for 24 hours.

Example 2

Preparation of PMDA-6RSDA-TMMDA Polyimide Dense Film Membrane 5.0 g of PMDA-6RSDA-TMMDA polyimide synthesized in Example 1 was dissolved in 20.0 g of NMP solvent. The mixture was mechanically stirred for 2 hours to form a homogeneous casting dope. The resulting homogeneous casting dope was allowed to degas overnight. The PMDA-6RSDA-TMMDA dense film membrane was prepared from the bubble free casting dope on a clean glass plate using a doctor knife with a 15-mil gap. The membrane together with the glass plate was then put into a vacuum oven. The solvents were removed by slowly increasing the vacuum and the temperature of the vacuum oven. Finally, the membrane was heated at 200° C. under vacuum for 48 hours to completely remove the residual solvents.

Example 3

Preparation of UV Cross-Linked PMDA-6RSDA-TMMDA Polyimide Dense Film Membrane

The PMDA-6RSDA-TMMDA polyimide dense film membrane prepared in Example 2 was further UV cross-linked by exposure to UV radiation using 254 nm wavelength UV light generated from a UV lamp for a radiation time of 30 min.

Example 4

Evaluation of Gas Separation Performance of PMDA-6RSDA-TMMDA Polyimide Dense Film Membrane and UV Cross-Linked PMDA-6RSDA-TMMDA Polyimide Dense Film Membrane The PMDA-6RSDA-TMMDA polyimide dense film membrane and UV cross-linked PMDA-6RSDA-TMMDA polyimide dense film membrane were tested for $CO_2/CH_4$ and $H_2/CH_4$ separations at 50° C. under 791 kPa (100 psig) pure single feed gas pressure. The results show that the PMDA-6RSDA-TMMDA dense film membrane has $CO_2$ permeability of 23.6 Barrers and $CO_2/CH_4$ selectivity of 20.6 for $CO_2/CH_4$ separation and the UV cross-linked PMDA-6RSDA-TMMDA dense film membrane shows significantly improved $CO_2/CH_4$ selectivity (52) and decreased $CO_2$ permeability for $CO_2/CH_4$ separation (Table 1). The UV cross-linked PMDA-6RSDA-TMMDA dense film membrane also has $H_2$ permeability of 41 Barrers and high H2/CH4 selectivity of 270 for H2/CH4 separation (Table 2).

TABLE 1

Pure gas permeation test results of PDMA-6RSDA-TMMDA polyimide dense film membrane and UV cross-linked PMDA-6RSDA-TMMDA polyimide dense film membrane for $CO_2/CH_4$ Separation[a]

| Membrane | $P_{CO2}$ (Barrer) | $\alpha_{CO2/CH4}$ |
|---|---|---|
| PMDA-6RSDA-TMMDA | 23.6 | 20.6 |
| UV cross-linked PMDA-6RSDA-TMMDA | 7.9 | 52.0 |

[a]$P_{CO2}$ and $P_{CH4}$ were tested at 50° C. and 690 kPa (100 psig); 1 Barrer = $10^{-10}$ cm$^3$ (STP).cm/cm$^2$.sec.cmHg.

TABLE 2

Pure gas permeation test results of PDMA-6RSDA-TMMDA polyimide dense film membrane and UV cross-linked PMDA-6RSDA-TMMDA polyimide dense film membrane for $H_2/CH_4$ Separation[a]

| Membrane | $P_{H2}$ (Barrer) | $\alpha_{H2/CH4}$ |
|---|---|---|
| PMDA-6RSDA-TMMDA | 46.6 | 40.5 |
| UV cross-linked PMDA-6RSDA-TMMDA | 41.0 | 269.7 |

[a]$P_{H2}$ and $P_{CH4}$ were tested at 50° C. and 690 kPa (100 psig); 1 Barrer = $10^{-10}$ cm$^3$ (STP).cm/cm$^2$.sec.cmHg.

Example 5

Synthesis of PMDA-4RSDA-TMPDA Polyimide

PMDA-4RSDA-TMPDA polyimide was synthesized from polycondensation reaction of pyromellitic dianhydride (PMDA) with a mixture of 4,4'-bis(3-aminophenoxy)diphenylsulfone (4RSDA) and 2,4,6-trimethyl-m-phenylenediamine (TMPDA) in DMAc polar solvent by a two-step process similar to that for the synthesis of PMDA-6RSDA-TMMDA polyimide as described in Example 1.

Example 6

Preparation of PMDA-4RSDA-TMPDA Polyimide Dense Film Membrane

PMDA-4RSDA-TMPDA polyimide dense film membrane was prepared following the procedure same as that described in Example 2.

Example 7

Preparation of UV Cross-Linked PMDA-4RSDA-TMPDA Polyimide Dense Film Membrane The PMDA-4RSDA-TMPDA polyimide dense film membrane prepared in Example 6 was further UV cross-linked by exposure to UV radiation using 254 nm wavelength UV light generated from a UV lamp for a radiation time of 30 min.

Example 8

Preparation and Permeation Testing of PMDA-6RSDA-TMMDA Polyimide Asymmetric Flat Sheet Membranes A PMDA-6RSDA-TMMDA polyimide asymmetric flat sheet membrane was prepared from a casting dope comprising, by approximate weight percentages, 17.4% PMDA-6RSDA-TMMDA, 26.1% 1,3-dioxolane, 42.1% NMP, 7.2% acetone, and 7.2% methanol. A film was cast on a non-woven web then gelled by immersion in a 0° C. water bath for about 10 minutes, and then annealed in a hot water bath at 86° C. for 10-15 minutes. The resulting wet membrane was dried in at a temperature between 65° and 70° C. to remove water. The dry asymmetric membrane was coated with an epoxy silicone solution containing 2 wt-% epoxy silicone in hexane. The epoxy silicone coating was exposed to a UV source for a period of 5 to 10 minutes at ambient temperature to cure the coating while the silicone solvent evaporated to produce the epoxy silicone coated membrane of the present invention.

The epoxy silicone coated and uncoated PMDA-6RSDA-TMMDA polyimide asymmetric flat sheet membranes were evaluated for gas transport properties using a feed gas containing 10 vol-% $CO_2$, 90 vol-% $CH_4$ at a feed pressure of 6996 kPa (1000 psig) and 50° C. Table 3 shows a comparison of the $CO_2$ permeance and the selectivity (a) of the uncoated and coated asymmetric flat sheet membrane performances.

TABLE 3

Mixed gas permeation test results of uncoated and coated PMDA-6RSDA-TMMDA polyimide asymmetric flat sheet membranes for $CO_2/CH_4$ Separation[a]

| Membrane | $P_{CO2}/L$ (GPU) | $\alpha_{CO2/CH4}$ |
|---|---|---|
| Uncoated PMDA-6RSDA-TMMDA asymmetric flat sheet membrane | 185 | 10.7 |
| Coated PMDA-6RSDA-TMMDA asymmetric flat sheet membrane | 72 | 17.3 |

[a]$P_{CO2}/L$ and $P_{CH4}/L$ were tested at 50° C. and 6996 kPa (1000 psig), 10% $CO_2$/90% $CH_4$ mixed gas; 1 GPU = $10^{-6}$ cm$^3$ (STP)/cm$^2$ s (cm Hg).

The invention claimed is:

1. A process for separating at least one gas from a mixture of gases or at least one liquid from a mixture of liquids comprising providing an aromatic poly(ether sulfone imide) polymer membrane or a cross-linked aromatic poly(ether sulfone imide) polymer membrane; contacting the mixture of gases or the mixture of liquids to one side of the aromatic poly(ether sulfone imide) polymer membrane or the cross-linked aromatic poly(ether sulfone imide) polymer membrane to cause at least one gas or at least one liquid to permeate said membrane; and removing from an opposite side of said aromatic poly(ether sulfone imide) polymer membrane or said cross-linked aromatic poly(ether sulfone imide) polymer membrane a permeate gas composition or a permeate liquid composition comprising a portion of said at least one gas or said at least one liquid that permeated said membrane wherein said aromatic poly(ether sulfone imide) polymer membrane comprises a plurality of repeating units of formula (I)

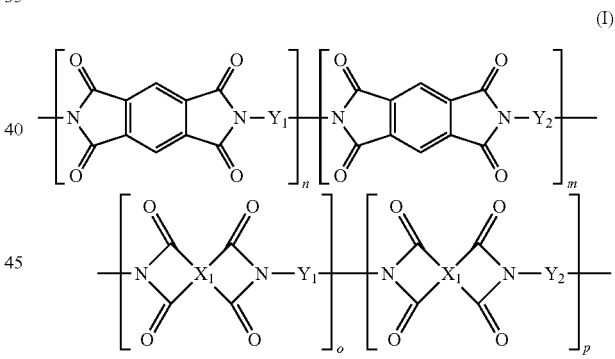

wherein $X_1$ is selected from the group consisting of

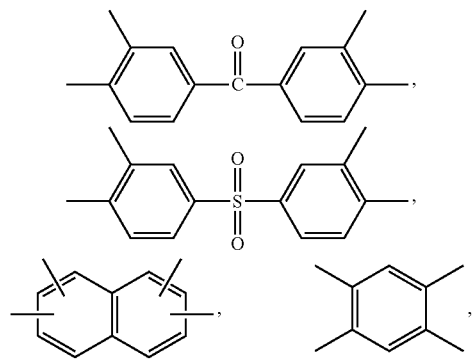

-continued

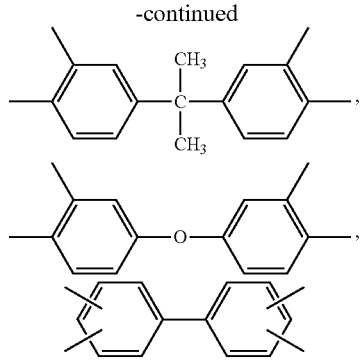

and mixtures thereof; wherein $Y_1$ is selected from the group consisting of

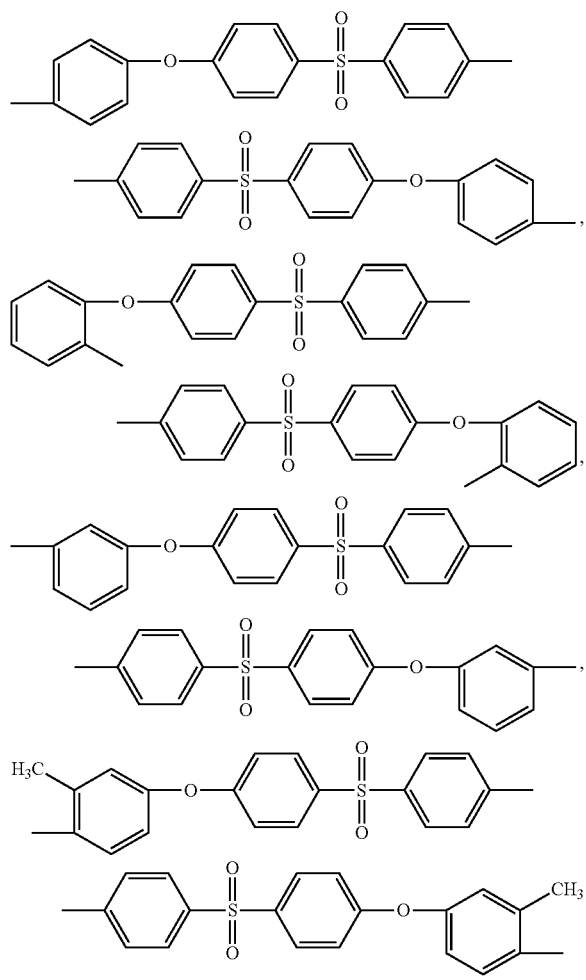

and mixtures thereof; wherein $Y_2$ is selected from the group consisting of

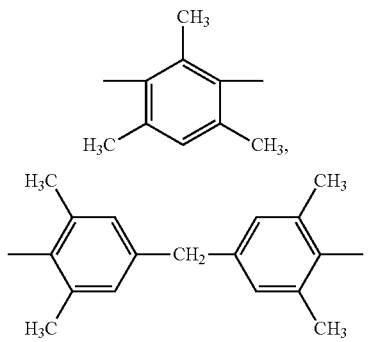

and mixtures thereof; n, m, o and p are independent integers from 2 to 500; and the molar ratio of (n+o)/(m+p) is in a range of 1:10 to 10:1.

2. The process of claim 1 wherein said mixture of gases comprises a mixture of volatile organic compounds in an atmospheric gas.

3. The process of claim 1 wherein said mixture of gases comprises a mixture of helium, carbon dioxide or hydrogen sulfide in natural gas.

4. The process of claim 1 wherein said mixture of gases comprises a mixture of hydrogen, nitrogen, methane and argon in ammonia purge gas streams or hydrogen in a stream from a refinery.

5. The process of claim 1 wherein said mixture of gases or mixture of liquids comprises a mixture of olefins and paraffins, a mixture of xylenes, a mixture of iso/normal paraffins, or a mixture of liquids in natural gas.

6. The process of claim 1 wherein said mixture of gases consists of a pair or group of gases selected from the group consisting of nitrogen and oxygen, carbon dioxide and methane, hydrogen and methane or carbon monoxide and helium and methane.

7. The process of claim 1 wherein the aromatic poly(ether sulfone imide) polymer membrane or the cross-linked aromatic poly(ether sulfone imide) polymer membrane is at an effective operating temperature from about 25° to about 100° C.

8. The process of claim 1 wherein a sufficient dew point margin is provided for effective removal of carbon dioxide from natural gas.

9. The process of claim 1 wherein organic liquids are removed from water or sulfur compounds are removed from gasoline, naphtha or diesel fuels.

* * * * *